US010054914B2

(12) United States Patent
Vartiainen et al.

(10) Patent No.: US 10,054,914 B2
(45) Date of Patent: Aug. 21, 2018

(54) PRESENTING PROCESS DATA OF A PROCESS CONTROL OBJECT ON A MOBILE TERMINAL

(71) Applicant: ABB RESEARCH LTD, Zürich (CH)

(72) Inventors: Elina Vartiainen, Västerås (SE); Martin Olausson, Västerås (SE); Jonas Brönmark, Västerås (SE)

(73) Assignee: ABB RESEARCH LTD, Zurich (CH)

( * ) Notice: Subject to any disclaimer, the term of this patent is extended or adjusted under 35 U.S.C. 154(b) by 376 days.

(21) Appl. No.: 14/400,024

(22) PCT Filed: Jun. 12, 2013

(86) PCT No.: PCT/EP2013/062110
§ 371 (c)(1),
(2) Date: Nov. 10, 2014

(87) PCT Pub. No.: WO2014/009088
PCT Pub. Date: Jan. 16, 2014

(65) Prior Publication Data
US 2015/0177718 A1    Jun. 25, 2015

(30) Foreign Application Priority Data
Jul. 11, 2012    (EP) .................. 12175911

(51) Int. Cl.
*G05B 15/02*    (2006.01)
*G05B 19/042*    (2006.01)
(52) U.S. Cl.
CPC ......... *G05B 15/02* (2013.01); *G05B 19/0423* (2013.01); *G05B 2219/23161* (2013.01)

(58) Field of Classification Search
CPC ............... G05B 15/02; G05B 19/0423; G05B 2219/23161
See application file for complete search history.

(56) References Cited

U.S. PATENT DOCUMENTS 5,598,572 A    1/1997  Tanikoshi et al.
5,856,931 A *  1/1999  McCasland ............ G06Q 10/06
                                              702/176

(Continued)

FOREIGN PATENT DOCUMENTS

EP    1 975 751 A1    10/2008
EP    2 077 473 A1    7/2009

(Continued)

*Primary Examiner* — Jason Lin
*Assistant Examiner* — Olvin Lopez Alvarez
(74) *Attorney, Agent, or Firm* — Birch, Stewart, Kolasch & Birch, LLP

(57) ABSTRACT

A method, presentation control arrangement and a computer program product enables a user of a process control system to obtain details of a process control object. Distances between a mobile terminal of the user and process control objects in an area around the mobile terminal are determined as well as the closest process control object to the mobile terminal, process data of this object is obtained and presented together with a representation of the object on a display of the mobile terminal, where the representation of the closest process control object is emphasized compared with the presentation of other process control objects and the amount of process data being presented is dependent on the distance between the mobile terminal and the process control object.

15 Claims, 5 Drawing Sheets

(56) References Cited

U.S. PATENT DOCUMENTS

| | | | |
|---|---|---|---|
| 7,043,310 B2 | 5/2006 | Polz et al. | |
| 7,116,993 B2 | 10/2006 | Farchmin et al. | |
| 7,194,446 B1 | 3/2007 | Bromley et al. | |
| 7,272,456 B2 | 9/2007 | Farchmin et al. | |
| 7,873,371 B2 | 1/2011 | Öberg et al. | |
| 8,125,310 B2 | 2/2012 | Enkerud et al. | |
| 8,661,369 B2* | 2/2014 | Heo | G06F 3/0481 340/10.1 |
| 9,208,512 B1* | 12/2015 | Chatterjee | G06Q 30/0261 |
| 2007/0078526 A1* | 4/2007 | Bromley | G05B 19/0423 700/19 |
| 2007/0249367 A1* | 10/2007 | Sato | G06F 17/3087 455/456.3 |
| 2008/0077255 A1* | 3/2008 | Gila | G05B 19/042 700/13 |
| 2009/0065578 A1 | 3/2009 | Peterson et al. | |
| 2009/0256814 A1* | 10/2009 | Chung | G06F 1/3215 345/173 |
| 2010/0223003 A1* | 9/2010 | Harada | G01C 21/3682 701/533 |
| 2011/0285658 A1* | 11/2011 | Homma | G06F 1/1626 345/173 |
| 2012/0011137 A1* | 1/2012 | Sheha | G01C 21/3679 707/758 |
| 2012/0316782 A1* | 12/2012 | Sartipi | G01C 21/367 701/455 |
| 2013/0024542 A1* | 1/2013 | Keller | G05B 19/0428 709/217 |
| 2013/0060351 A1* | 3/2013 | Imming | H04W 4/029 700/13 |
| 2013/0241925 A1* | 9/2013 | Konami | G06T 15/08 345/419 |
| 2013/0286206 A1* | 10/2013 | Ozaki | H04N 7/18 348/148 |
| 2013/0288719 A1* | 10/2013 | Alonzo | H04W 4/043 455/457 |
| 2014/0236328 A1* | 8/2014 | Kamon | D06F 33/02 700/90 |
| 2015/0081104 A1* | 3/2015 | Madonna | H04L 67/025 700/275 |

FOREIGN PATENT DOCUMENTS

| | | | | |
|---|---|---|---|---|
| WO | WO 2012/069814 A1 | | 5/2012 | |
| WO | WO2012069814 | * | 5/2012 | ....... G06Q 10/06311 |

* cited by examiner

PRESENTING PROCESS DATA OF A PROCESS CONTROL OBJECT ON A MOBILE TERMINAL

FIELD OF THE INVENTION

The present invention generally relates to process control systems. More particularly the present invention relates to a method, data presentation control arrangement and a computer program product for enabling a user of a process control system to obtain details of a process control object.

BACKGROUND

A process control system normally comprises a number of process control objects involved in the control of the process.

In process control systems there are furthermore maintenance engineers that are most of the time working on the process floor close to these process control objects, which is typically far away from control rooms with work stations and other computers from which the system is monitored. The maintenance engineers make sure the process runs as smooth as possible by both preventive and direct maintenance.

These maintenance engineers strongly depend on the operators located in the control room to get access to process data from the process control objects they need to perform their work on.

There do exist remote desktop solutions for mobile terminals in order to allow the maintenance engineers to work independently and not having to rely on help from operators located in the control room. This allows the maintenance engineers to view process data, view status of process graphics, make adjustments to process control objects and get information from the process control system. This means that maintenance engineers no longer have the same need for a constant backup from an operator.

There is a problem in that a remote desktop solution is not flexible in that normally a user has to start from the same position in the graphical representation of the system before reaching a process control object in which he or she is interested. Furthermore, the displays of mobile terminals are small and there may be a need for a selection which process control objects are to be presented.

U.S. Pat. No. 7,043,310 describes the use of Personal Digital Assistants (PDAs) or mobile radio telephones in automation systems. In this document, the nearest automation component to a process control object is displayed on a display of a PDA or a mobile radio telephone.

U.S. Pat. No. 5,598,572 in turn describes an information terminal system including a process control computer and a portable terminal device for inputting information to the process control computer and gaining information from the process control. The system includes component information storing means for storing information for distinguishing each one of plural components composing a plant and component identifying means for identifying a component from plural components composing a plant and existing in the direction indicated by and at the location of the portable terminal device, by using information for distinguishing each one of the plural components stored in the component information storing means.

U.S. Pat. No. 7,194,446 describes the rendering of an HMI (Human Machine Interface) based on the proximity of a user to a zone. If the user is within the zone then the HMI may be set to only display the machinery of the zone. There is thus a binary type of display. If the user is in a zone all devices in the zone are displayed.

A similar approach is used in EP 2077473. If a user is in a certain control area, then the user is granted or denied access to the area based on user privileges, where the access may be the access only to the area. The user may more particularly be allowed to only view or configure devices that are in the control area.

Despite the teachings of the above mentioned documents, there is still a need for improvement within the field.

The present invention addresses one or more of the above-mentioned problems.

SUMMARY OF THE INVENTION

The present invention addresses the problem of simplifying the obtaining of details of process control objects. The invention is therefore directed towards improving the ease of obtaining details of a process control object via a mobile terminal. The invention is also directed towards providing a way to distinguish between plural components controlled by the process control system.

This object is according to a first aspect of the invention solved through a method of enabling a user of a process control system to obtain details of a process control object, the method being performed by a presenting control arrangement and comprising the steps of:
  guiding the user carrying a mobile terminal to the vicinity of a first process control object, and when in this vicinity further perform
  determining distances between the mobile terminal of the user and process control objects in an area around the mobile terminal,
  determining which process control object in the area that is closest to the mobile terminal, which process control object is a primary process control object,
  obtaining process data of the primary process control object, and
  presenting representations of the process control objects on a display of the mobile terminal, where
    the presentation of the representation of the primary process control object is emphasized compared with the presentation of the other process control objects in the area, the process data of the primary process control object is presented together with the corresponding representation, and the amount of process data being presented increases with decreasing distance between the mobile terminal and the primary process control object.

This object is according to a second aspect of the invention solved through a data presentation control arrangement for enabling a user of a process control system to obtain details of a process control object, the data presentation control arrangement comprising:
  a guiding unit configured to guide the user carrying a mobile terminal to the vicinity of a first process control object,
  a positioning unit, and
  a presentation control unit
  wherein when the user is in said vicinity
  the positioning unit is configured to
    determine distances between the mobile terminal of the user and process control objects in an area around the mobile terminal, and determine which process control object in the area that is closest to the mobile terminal, which process control object is a primary process control object, and the presentation control unit is configured to obtain process data of the primary process control object, and present representations of the process control objects on a display of the mobile terminal, where the presentation of the representation of the primary process control object is emphasized compared with the presentation of the other process control objects in the area, said process data is presented together with the corresponding representation, and the amount of process data being presented increases with decreasing distance between the mobile terminal and the primary process control object.

This object is according to a third aspect of the invention solved through a computer program product for enabling a user of a process control system to obtain details of a process control object, said computer program product being provided on a data carrier comprising computer program code configured to cause a data presentation control arrangement to, when said computer program code is loaded into at least one device providing the data presentation control arrangement, guide the user carrying a mobile terminal to the vicinity of a first process control object, and when in this vicinity further determine distances between the mobile terminal of the user and process control objects in an area around the mobile terminal, determine which process control object in the area that is closest to the mobile terminal, which process control object is a primary process control object, obtain process data of the primary process control object, and present representations of the process control objects on a display of the mobile terminal, where the presentation of the representation of the primary process control object is emphasized compared with the presentation of the other process control objects in the area, and said process data is presented together with the corresponding representation, and the amount of process data being presented increases with decreasing distance between the mobile terminal and the primary process control object.

The present invention has a number of advantages. It makes the navigation in process control systems using mobile terminals both easier and faster, therefore making the maintenance engineer effective. It provides an intuitive user interface, which enhances understanding of the process and the system. The user interface is simple and easy because of less clutter as information "far away" can be hidden from the user. The invention also allows information to be shown according to prioritization based on distance.

BRIEF DESCRIPTION OF THE DRAWINGS

The present invention will in the following be described with reference being made to the accompanying drawings, where FIG. 1 schematically shows an industrial plant with a process control system operating an industrial process together with a mobile terminal associated with a maintenance engineer, FIG. 2 schematically shows a front view of a mobile terminal, FIG. 3 schematically shows a block schematic of the mobile terminal.

DETAILED DESCRIPTION OF THE INVENTION

In the following, a detailed description of preferred embodiments of a method, data presentation control arrangement and a computer program product for enabling a user of a process control system to obtain details of a process control object will be given.

Figure 1:
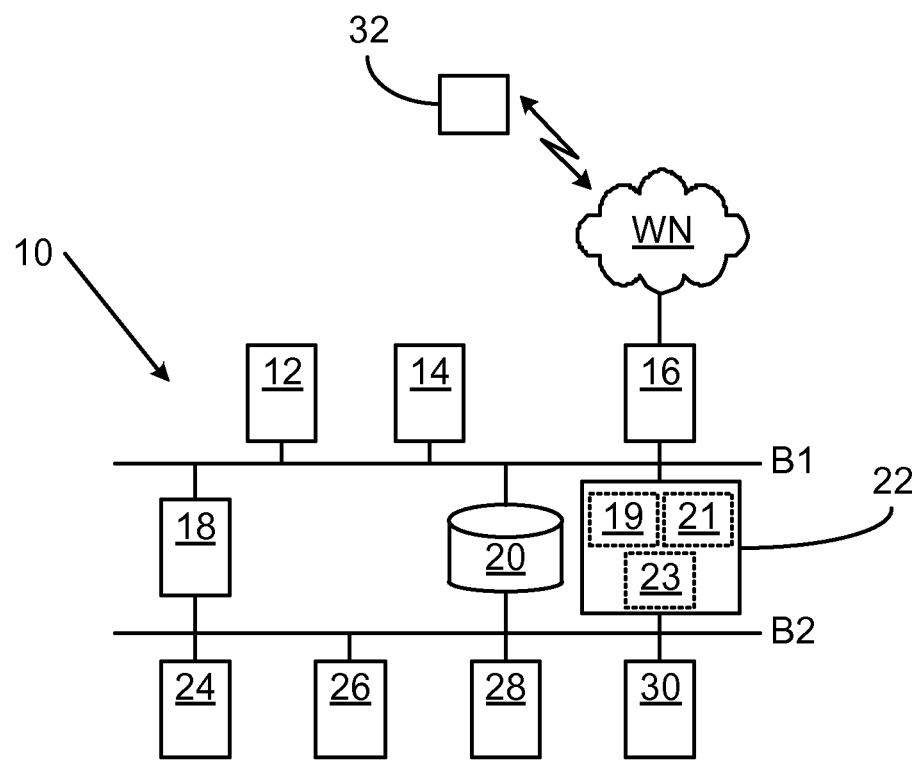

FIG. 1 schematically shows an industrial plant where a process control system 10 is provided. The process control system 10 is a computerized process control system for controlling an industrial process. The process can be any type of industrial process, such as electrical power generation, transmission and distribution processes as well as water purification and distribution processes, oil and gas production and distribution processes, petrochemical, chemical, pharmaceutical and food processes, and pulp and paper production processes. These are just some examples of processes where the system can be applied. There exist countless other industrial processes. The processes may also be other types of industrial processes such as the manufacturing of goods. A process may be monitored through one or more process monitoring computers, which communicate with a server handling monitoring and control of the process.

In FIG. 1 the process control system 10 therefore includes a number of process monitoring computers 12 and 14. These computers may here also be considered to form operator terminals and are connected to a first data bus B1. There is also a gateway 16 connected to this first data bus B1, which gateway 16 is connected to at least one wireless network WN. To the wireless network WN there is connected a mobile terminal 32. It should be realized that it is possible with more mobile terminals in the wireless network WN. However, only one is shown for simplifying the understanding of the present invention. The wireless network WN may be a local network, such as a wireless local area network (WLAN). It may also be a Bluetooth network, i.e. a network with a number of interconnected Bluetooth nodes. The network may furthermore be a mobile communication network, such as a public land mobile communication network (PLMN).

There is furthermore a second data bus B2 and between the first and second data busses B1 and B2 there are connected a server 18 providing control and protection of the process and a database 20 where data relating to control and protection of the process is stored. Such data relating to control and protection may here comprise process data such as measurements and control commands, while data relating to protection may comprise alarm and event data as well as data on which alarms and events can be generated, such as measurements made in the process. There is furthermore a data presentation control server 22 connected between the two buses B1 and B2. The data presentation control server 22 comprises a positioning block 19, a presentation control block 21 and a guiding block 23. This data presentation control server 22 does in a first variation of the invention provide a data presentation control arrangement. In other variations of the invention it may be completely omitted, in which case the mobile terminal 32 forms a data presentation control arrangement.

To the second data bus B2 there is furthermore connected a number of further devices 24, 26, 28 and 30. These further devices 24, 26, 28 and 30 are field devices, which are devices that are interfaces to the process being controlled. A field device is typically an interface via which measurements of the process are being made and to which control commands are given. Because of this the field devices are furthermore process control objects. In one variation of the invention a first field device is a first process control object 24, as an example a tank and the second field device is a second process control object 26, as an example a centrifuge.

Figure 2:
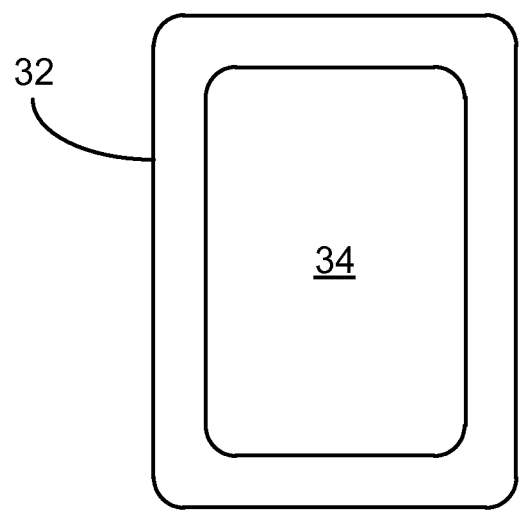

FIG. 2 schematically shows a front view of the first mobile terminal 32. It simply comprises a display 34. The display 34 is in some variations of the invention a touch screen via which data can be presented for the user of the mobile terminal 32 as well as via which data can be entered by the user, such as selections of various features in applications. It should be realized that in other variations of the invention the display may only be a display and the inputs provided through a keypad or a keyboard, a trackball, a joystick or some other buttons.

Figure 3:
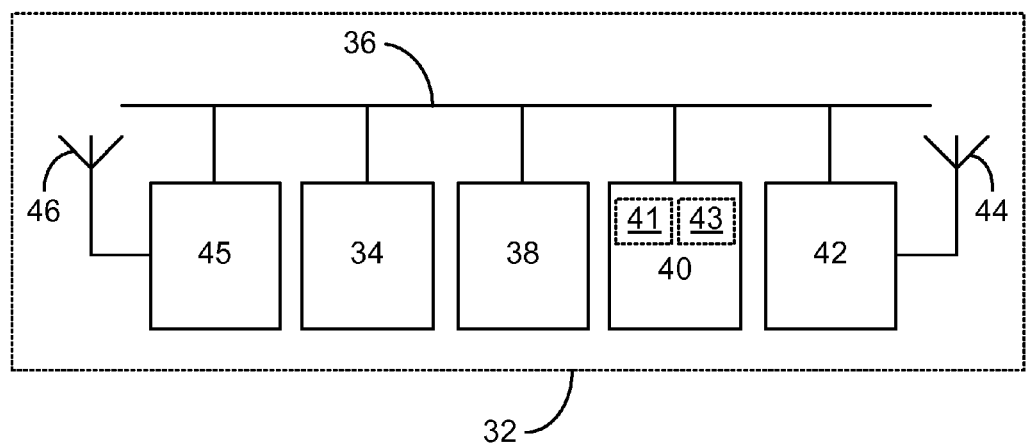

FIG. 3 shows a block schematic of the first mobile terminal 32. The first mobile terminal 32 comprises a bus 36 and to this bus there is connected the display 34, a processor 38, a program memory 40 as well as a first radio communication circuit 42. The first radio communication circuit 42 is furthermore connected to a first antenna 44. There is also a second radio communication unit 45 connected to a second antenna 46. The first radio communication unit 42 and first antenna 44 are provided for communication with the wireless network WN, while the second radio communication unit 45 and second antenna 46 may be provided for direct communication with process control objects. It is in some embodiments of the invention possible that the second radio communication unit 45 and second antenna 46 are omitted.

In the program memory 40 there is provided software code which when being run by the processor forms a positioning element 41 and a presentation control element 43. In some embodiments of the invention the presentation control element 43 is merely a slave unit presenting process data and process control object representations under the control of the presentation control server 22, which server then forms the presentation control arrangement. In other variations the positioning and presentation control elements 41 and 43 are positioning and presentation control units of a presentation control arrangement, which receives process data from the presentation control server 22. In this latter case the mobile terminal 32 therefore forms a presentation control arrangement.

Figure 4:
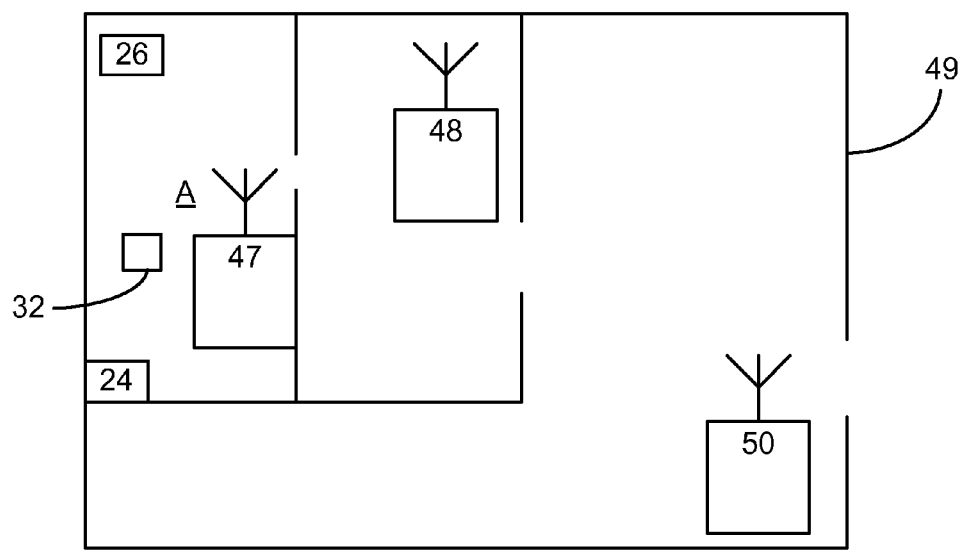
FIG. 4 shows premises of the industrial plant with a number of rooms, where the mobile terminal is in a first of the rooms comprising two process control objects, FIG. 5 schematically shows the user in the room with the two process control objects, FIG. 6 schematically shows a view shown on the display of the mobile terminal.

FIG. 4 schematically shows a facility 49 of the industrial plant. The facility 49 is here in the form of a building with a number of rooms. There is here a first room. In this first room the first and second process control objects 24 and 26 are located. In the first room there is a first wireless access point 47 of the wireless network. In this figure also the first mobile terminal 32 is located in the first room, which indicates that also the corresponding user is in this first room. Next to the first room there is a second room with a second wireless access point 48. The second room in turn leads to a third larger room with a third wireless access point 50. In the third room there is a door leading out of the premises 49. All the access points 47, 48 and 50 are here furthermore located close to doors leading to or from the rooms. The first wireless access point 47 is therefore provided close to a door interconnecting the first and the second rooms, the second wireless access point 48 is located close to a door interconnecting the second and the third rooms and the third wireless access point 50 is provided close to the door leading out of the building 49. The above described access point positions close to doors are only exemplary in that they simplify the giving of guiding instructions. However the invention is in no way limited to these positions. Other may thus be used.

The first room is here also shown as providing an area A that surrounds the first mobile terminal 32.

Furthermore the positions of the wireless access points 47, 48 and 50 are typically known and because of this also the positions of the mobile terminals and consequently the users may be known.

Figure 5:
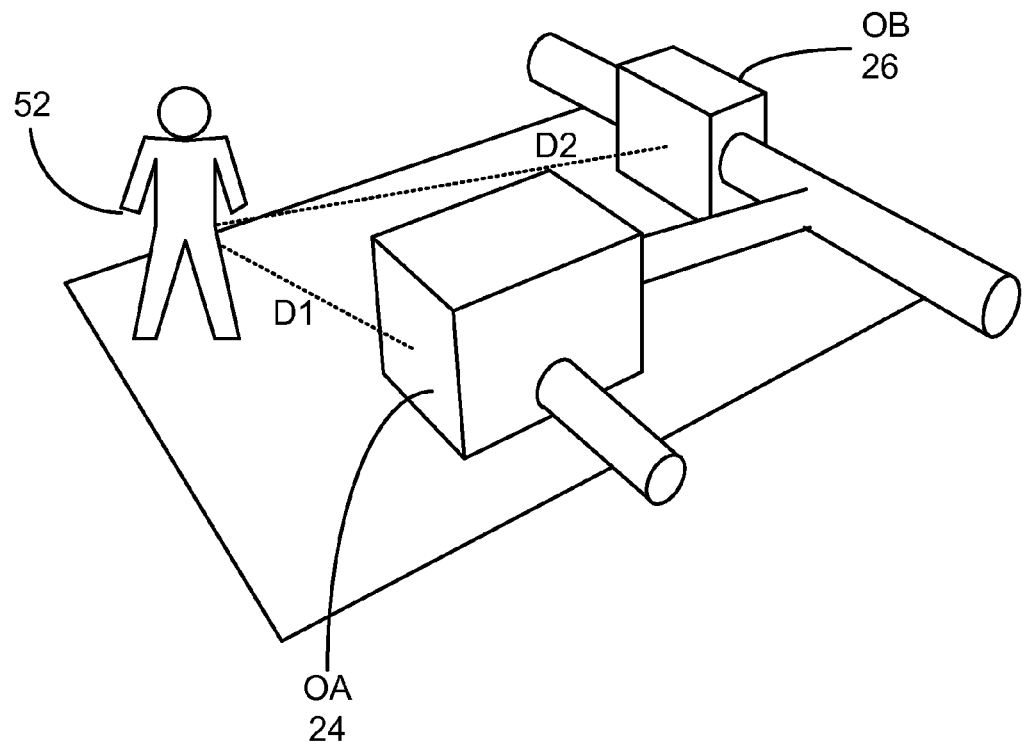
Figure 6:
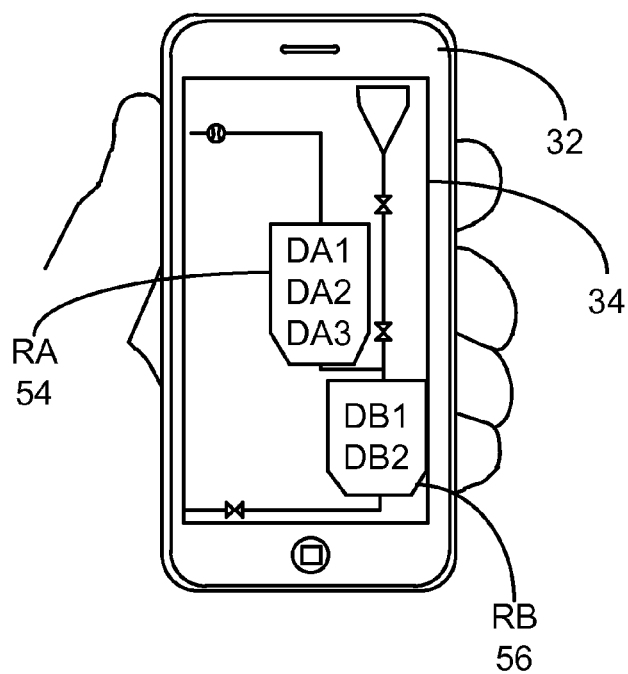
Figure 7:
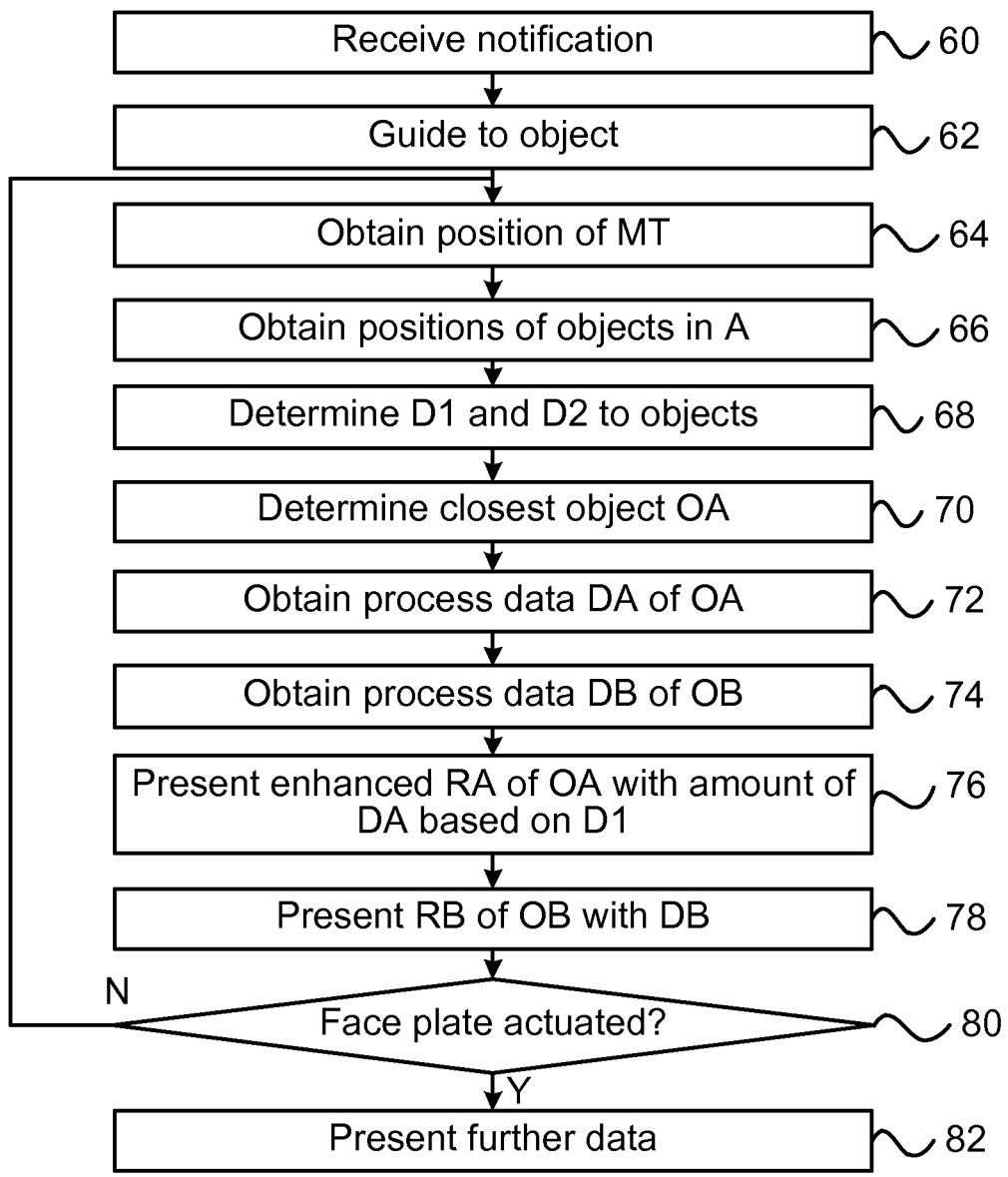
FIG. 7 shows a flow chart of a number of method steps being performed in a first variation of a method of enabling a user in a process control system to obtain details of a process control object.

A first embodiment of the invention will now be described with reference also being made to FIGS. 5-7, where FIG. 5 schematically shows the user of the first mobile terminal in the first room with the first and second process control objects 24 and 26, FIG. 6 schematically shows a view shown on the display 34 of the mobile terminal 32 and FIG. 7 shows a flow chart of a number of method steps being performed in a first variation of a method of enabling a user in the process control system to obtain details of a process control object.

The mobile terminals available today are equipped with a lot of different sensors, such as Global Positioning System (GPS), Bluetooth, and Near Field Communication (NFC). Using these sensors as well as other communication systems it would be possible to detect the position of the mobile terminal. If the process control system 10 is also aware of the physical position of process control objects then it is possible to calculate the distance between a mobile terminal and the surrounding process control objects.

With this information it is possible to dynamically update the user interface on the mobile terminal depending on the proximity of a maintenance engineer to process control objects. When a maintenance engineer approaches a process control object, the mobile terminal he or she is carrying will then automatically update its display to present the correct process graphics. This includes, but is not limited to, highlighting the corresponding process control object on the mobile terminal display 34. The process control object may then be located in the center of the display with extended information such as real time values, object name, alarms etc.

The user 52 of the mobile terminal 32 may thus typically be a maintenance engineer performing some activity in the premises.

The maintenance engineer 52 may at some instance in time need to go to a specific process control object such as the first process control object 24. In for instance the case of a fault on the first process control object 24 it may be necessary to inspect it.

In this first embodiment the server 22 keeps track of the users and their positions in the plant 10. The positioning block 19, the presentation control block 21 and guiding block 23 do in this embodiment form a positioning unit, a presentation control unit and a guiding unit of the presentation control arrangement formed by the presentation control server 22. Furthermore, the memory 40 of the mobile terminal 32 does not include any positioning element but only a presentation control element.

The presentation control server 22 may obtain the position of the mobile terminal 32. This position may be obtained via the wireless network WN. The position of the mobile terminal 32 may more particularly be obtained through knowledge of which wireless access point 47, 48 and 50 it is in contact with. The signal strength of the communication between the mobile terminal and access point may be used to determine the distance of a mobile station from the access point, which gives a radius around the access point at which the mobile terminal may be located. This together with knowledge of the layout of the premises, such as where walls, floors and ceilings are provided, may be used for estimating the position. Furthermore, if a mobile terminal is in contact with more access points, then triangulation may be used. Here the points of intersection of the radiuses of two or three access points may be used for determining the position. Also this may be combined with knowledge of the layout of the premises in order to determine the position of the mobile station. The server may also have knowledge of the positions of the process control objects.

The first embodiment will now be described in more detail with the example of the premises in FIG. 4 and in relation to a first user 52 and his or her first mobile terminal 32 as shown in FIGS. 5 and 6.

The user of the first mobile terminal 32 is initially in some other location of the premises than the first room.

The presentation control block 21 of the presentation control server 22 may now receive an indication or a notification, perhaps from the server 18, about a problem associated with the first process control object 24. It may thus receive a notification that the first process control object 24 needs inspection, step 60 in FIG. 7. In order to be able to inspect the object the user 52 is then guided towards the object, step 62.

For this reason the presentation control block 21 may inform the guiding block 23 about the first process control object 24 needing inspection, whereupon the guiding block 23 may guide the user 52 to the first process control object 24, step 62.

The guiding block 23 may more particularly create guiding instructions for guiding the user 52 to the vicinity of the first process control object, which in this case is the first room. The guiding instructions for the user 52 may for instance be based on the original location of the first mobile terminal 32 and comprise a number of instructions guiding the user 52 from this original location to the vicinity of the first process control object 24.

The first mobile terminal 32 thus receives the guiding instructions. All this data may in this first embodiment be received by the first radio circuit 42 via the first antenna 44 and then forwarded to the presentation control element 43. It is here as an alternative possible that the presentation control element 43 itself has a set of instructions for guiding the user to the vicinity of the first process control object 24 and then it itself determines its own position.

After this has been done the presentation control element 43 presents the guiding instructions to the user 52 for guiding him or her to the vicinity or an area surrounding the first process control object 24. The guiding data typically comprises instructions on how to find the first room. The guiding instructions may thus provide directions. These directions may furthermore be dynamically updated based on the position of the user.

When the user then enters the first room, i.e. when being in the vicinity of the first process control object, the positioning block 19 obtains the position of the first mobile terminal 32, step 64, which position may thus be obtained based on the position of the first wireless access point 47. If the process control object is outdoors then also GPS is an option. The positioning block 19 also obtains the positions of the process control objects 24 and 26 in the area A surrounding the mobile terminal, step 66. As the process control objects 24 and 26 may be stationary these positions may be known beforehand and may for instance be fetched from a database with process control object information.

The positioning block 19 then determines the distance D1 between the first process control object 24 and the mobile terminal 32 as well as the distance D2 between the second process control object 26 and the mobile terminal 32, step 68. The distances D1 and D2 may be determined based on the previously mentioned positions. After that the positioning block 19 determines which of the objects is closest, step 70, where the closest object is a primary object OA and the other object is a secondary object OB. As can be seen in FIG. 5, the first object 24 is closer to the user 52 than the second object 26, why this first object 24 is a primary object OA and the second object 26 is a secondary object OB. It should here be realized that there may be more process control objects even further away, such as a tertiary object. The data presentation control block 21 is then informed of which object is the primary object OA as well as perhaps the distances to objects. The data presentation control block 21 furthermore receives process data DA1, DA2 and DA3 of the primary object OA, step 72, as well as process data DB1, DB2 of the secondary object OB, step 74. This process data may be received from the server 18 and may thus be real-time data of the process control objects.

Thereafter the presentation control block 21 provides an enhanced representation of the primary object, which representation may be in the form of a face plate or icon, step 76. The presentation control block 21 may instruct the presentation control element 42 of the mobile terminal 32 to present an enhanced representation RA of the primary object OA together with process data DA1, DA2, DA3 of this primary object. The enhancing is in the first embodiment performed through instructing the presentation control element to present the representation of the primary object in the center of the display 34. The enhancing may also involve highlighting. The amount of process data is here also dependent on the distance between the mobile terminal and the primary process control object. In the present embodiment the amount of information being presented increases with decreasing distance to the primary process control object OA. This means that the closer the user 52 gets to the object the more process data is presented. In the present example three items of data are presented DA1, DA2, DA3, where a first may be pressure, a second may be temperature and a third may be content (gas or liquid). The presentation control block 21 may here only provide the presentation control element 43 with data of the amount corresponding to the distance.

The presentation control 21 block also presents a representation RB of the secondary process control object 26 together with corresponding process data DB1 and DB2, step 78. This may involve instructing the presentation control element 43 to present the representation RB of the secondary object OB together with the corresponding process data DB1, DB2. In this presentation DB1 may be pressure and DB2 may be temperature. It can here be seen that less process data of the secondary process control object OB is presented than of the primary process control object OA.

If then a face plate is actuated by the user via the display 34, step 80, data identifying this actuation may be detected by the presentation control element 43 and forwarded to the presentation control block 21. Based on this actuation the presentation control block 21 may then request further data of the object from the server 18, which then returns such data. As an alternative or in addition the presentation control server 22 may fetch the additional data from a database associated with the actuated process control object. The additional data is then sent from the presentation control block 21 to the presentation control element 42 for being presented, step 82. The presentation control element 43 thereafter presents the additional data via the display 34.

In case no actuation is made, step 80, then the positioning block 19 continues and determines positions, distances and closest object, steps 64, 66, 68 and 70, while the presentation control block 21 receives the determination of closest object and distances and then determines what process data and representation is to be presented based on the distance, steps 72, 74, 76 and 78.

The invention presents a way to use the physical proximity to a process control object in order automate the following actions when using mobile terminals:

Navigate, in the mobile terminal display, automatically to the process graphics of the process control object being physically closest to the mobile terminal.

The closest process control object may always be in the center of the mobile device display.

For the closest process control object extended detail information may be shown such as faceplate and process real time data etc.

The further away a process control object is from the mobile terminal the less information about that object may be presented on the display about that particular object in order to save display space and to avoid clutter.

When the maintenance engineer that carries a mobile terminal is approaching a process control object, the mobile terminal will thus automatically navigate to the corresponding process display and display process data from the process control object in the mobile terminal display, thereby eliminating the need for the process engineer to manually navigate via the mobile terminal user interface.

This automatic navigation will make mobile editions of process graphics much easier and provide faster use as maintenance engineers no longer have to manually navigate, via the mobile terminal user interface, to the process control object they are physically close to. Conventional navigation may still be available in order to allow the maintenance engineers to also inspect the process control graphics of process control objects that are far away. They will thus not be forced to physically move to the location in order to inspect the object.

Imagine the following scenario:

1. Erica the maintenance engineer 52 receives information about a process control object, tank 24 that might need some maintenance. She starts walking towards the tank.

2. As Erica gets closer to the tank, the display 34 on the mobile terminal 32 of Erica will automatically
   a. Zoom in on the tank.
   b. Display all process data DA1, DA2, DA3 for the tank, together with a shortcut to open the faceplate 54 for the tank.

3. Erica is still able to view the most relevant data for other process objects. If Erica for instance would like more information of the centrifuge 26 all she needs to do is to get closer to it or to press on the representation 56 of the object with her finger on the mobile terminal display 34.

This will let the users of mobile terminals to take advantage of the advanced sensors that these devices are equipped with and use them as input for controlling the user interface.

By determining the proximity of the maintenance engineer to the process objects it is possible to adjust the information shown on the display. When the maintenance engineer is far away from the primary object, only the most crucial information about it may be shown on the display. As the maintenance engineer gets closer to the primary object additional information may be shown. Information that might only be useful when the maintenance engineer is doing troubleshooting on an object may then only be displayed when the maintenance engineer is located right next to the object.

This further implies that there may be a order of priority in which the process data is presented. The presentation control unit may thus ensure that the process data is presented in the order of priority based on the distance to the primary object.

There is also less cluttered display since proximity decides which data to show on the mobile display.

This invention will make navigation in process control systems using mobile terminals both easier and faster, therefore making the maintenance engineer more effective.

The intuitive user interface enhances understanding of the process and the system. The user interface will be less cluttered as information "far away" can be hidden from the user. This will result in a simpler and easier to use interface.

Natural navigation. As people know their physical location they are easily able to interpret the process diagram shown on the mobile display.

The enhancement was above described through positioning the primary process control object in the middle of the process graphics. As an alternative or in addition it may be highlighted. As yet another alternative it is possible that the size of the representation is made bigger than the representations of other objects.

Figure 8:
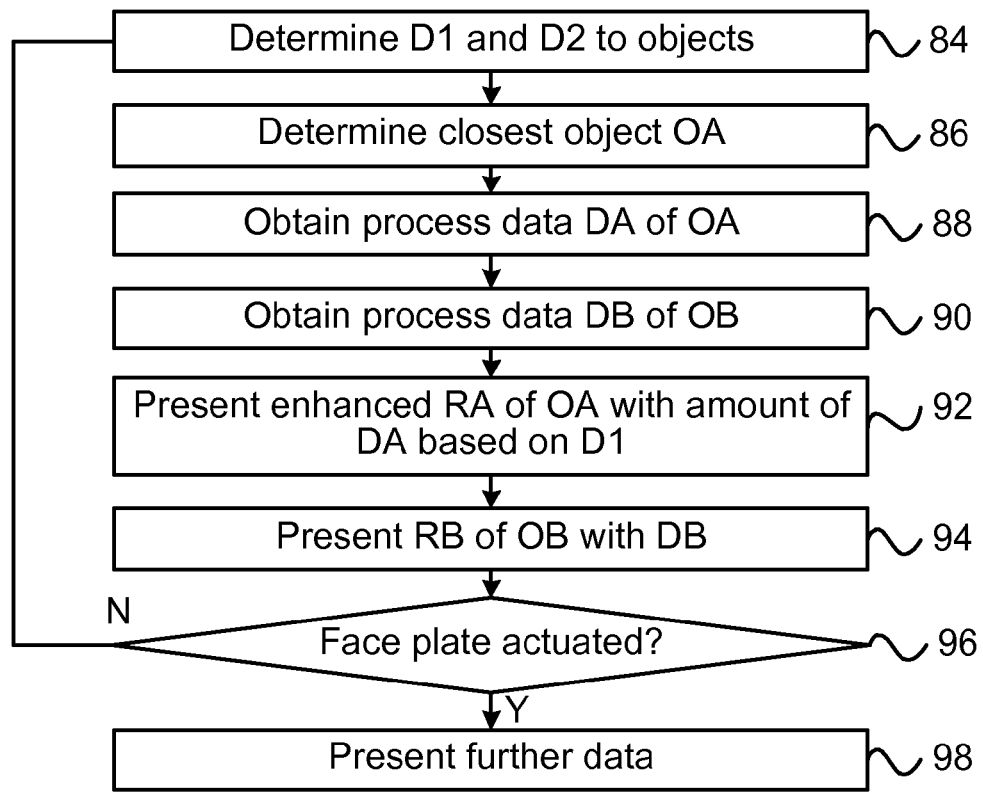
FIG. 8 shows a flow chart of a number of method steps being performed in a second variation of a method of enabling a user in a process control system to obtain details of a process control object, and FIG. 9 schematically shows a data carrier with computer program code, in the form of a CD-ROM disc, for performing the steps of the method.

Now a second embodiment of the invention will be described with reference being made to FIG. 8 instead of FIG. 7. In this embodiment the presentation control server 22 is not used. The positioning element 41 and presentation control elements 43 form the positioning unit an presentation control unit of a presentation control arrangement, which arrangement is thus implemented through the mobile terminal 32.

The second variation of the method starts as the first user enters the first room. In this case local positioning, such as a Bluetooth or RFID is used to determine the distances D1 and D2 to the objects in the area A around the mobile terminal, step 84. This can be done using the second radio communication unit 45 and second antenna 46. After that the positioning element 41 determines which of the objects 24 and 26 is closest, step 86, where the closest object is a primary object OA and the other object is a secondary object OB. The presentation control element 43 is then informed of which object is the closest object as well as the distance D1. The distances D1 and D2 and the data of which object is the primary object is then provided to the presentation control element 43. The presentation control element 43 furthermore receives or obtains process data DA1, DA2 and DA3 of the primary object OA, step 88, as well as receives or obtains process data DB1, DB2 of the secondary object OB, step 90. This data may be received from the server 18 for instance via the first radio communication unit 42 and first antenna 44 and may thus be real-time data of the process control objects.

Thereafter the presentation control element 43 presents an enhanced representation RA of the primary object OA, which representation RA may be in the form of a face plate or icon, step 92. The enhancing is also in the second embodiment performed through presenting the representation of the primary object in the centre of the display and possibly also highlighted. The representation OA is also here presented with the process data DA1, DA2, DA3, where the amount of process data presented is also here dependent on the distance between the mobile terminal and the primary process control object OA.

The presentation control element 43 also presents a representation of the secondary process control object OB, step 94. In this presentation there is also presented process data DB1 and DB2. Also here less process data of the secondary process control object OB is presented than of the primary process control object OA.

If then a face plate is actuated by the user, step 96, then the presentation control element 43 may request further data of the object from the server 18, which then sends such data, which data is then being received and presented, step 98. In case no actuation is made, step 96, then the positioning element 41 continues and determines distances and closest object, step 84 and 86. The presentation control element 43 receives and determines what process data is to be presented based on the distance, steps 88, 90, 92 and 94.

Figure 9:
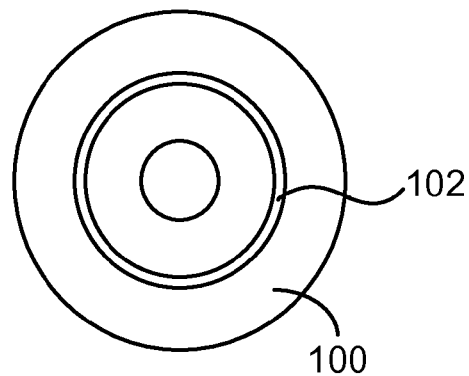

The positioning unit, presentation control unit and guiding unit may, as was previously described, all be provided in the form of one or more processors together with computer program memory including computer program code for performing their functions. As an alternative they may be provided in the form of a Application Specific Integrated Circuit (ASIC) or Field-Programmable Gate Array (FPGA). This computer program code may also be provided on one or more data carriers which perform the functionality of the present invention when the program code thereon is being loaded into a presentation control server or a mobile terminal. One such data carrier 100 with computer program code 102, in the form of a CD ROM disc, is schematically shown in FIG. 9. Such computer program may as an alternative be provided on another server and downloaded therefrom into the presentation control server and/or the mobile terminal.

The invention can be varied in many ways. It is for instance possible that a guiding unit is provided in the second embodiment but not in the first. There may furthermore be a number of hybrids of the two described embodiments. It is for instance possible that the positioning unit, which determines distances to process control objects and primary process control object, is provided in the presentation control server, while the presentation control unit is provided in the mobile terminal. It is also possible that the presentation control unit is provided in the presentation control server with the positioning unit being provided in the mobile terminal. The presentation control arrangement may therefore be split up with parts of it provided in the process control system, such as in the presentation control server and parts of it in the mobile terminal. In this way two devices, the server and the mobile terminal, together provide the arrangement. It can therefore be seen that the present invention is only to be limited by the following claims.

The invention claimed is:

1. A method of enabling a user of a process control system to obtain details of a process control object, wherein the process control system is a computerized process control system of an industrial plant for controlling an industrial process and comprises a plurality of process control objects, the method being performed by a processor executing a presenting control arrangement and comprising the steps of:
   guiding the user carrying a mobile terminal to a predetermined area around a first process control object based on an indication that the first process control object needs inspection;
   and when in the predetermined area around the first process control object further performing the steps of:
      determining distances between the mobile terminal of the user and said process control objects in a predetermined area around the mobile terminal;
      determining a primary process control object, which is the process control object that is closest to the mobile terminal in the predetermined area around the mobile terminal;
   obtaining process data of the primary process control object; and
   automatically presenting representations of said process control objects on a display of the mobile terminal,
   wherein:
   the presentation of the representation of the primary process control object is emphasized compared with the presentation of the other process control objects in the predetermined area around the mobile terminal,
   the process data of the primary process control object is presented together with the corresponding representation at a center of the display of the mobile terminal and is highlighted, and includes extended detail information comprising at least one of a faceplate of the primary process control object or real time process data, and
   the amount of process data being presented increases with decreasing distance between the mobile terminal and the primary process control object.

2. The method according to claim 1, further comprising the step of obtaining process data of at least one other process control object in the predetermined area around the mobile terminal, which process data is presented together with the representation of this other process control object, where the amount of process data of the other process control object being presented is less than the amount of process data presented together with the representation of the primary process control object.

3. The method according to claim 2, wherein representations of the objects can be actuated for presenting further process data and presenting further process data related a process control object based on a user actuation of the representation of the corresponding process control object.

4. The method according to claim 1, wherein representations of the objects can be actuated for presenting further process data and presenting further process data related a process control object based on a user actuation of the representation of the corresponding process control object.

5. The method according to claim 1, further comprising the step of obtaining position data of the mobile terminal and obtaining position data about process control objects in the predetermined area around the mobile terminal, where the determining of distances is performed based on the obtained positions.

6. The method according to claim 1, wherein the process control objects are devices with interfaces via which measurements of the industrial process are being made and to which control commands are given.

7. A data presentation control arrangement for enabling a user of a process control system to obtain details of a process control object, wherein the process control system is a computerized process control system of an industrial plant for controlling an industrial process and comprises a plurality of process control objects, the data presentation control arrangement comprising:
a guiding unit configured to receive an indication that a first process control object needs inspection and to guide the user carrying a mobile terminal to a predetermined area around the first process control object based on the indication;
a positioning unit;
and a presentation control unit,
wherein when the user is in the predetermined area around the first process control object:
the positioning unit is configured to:
determine distances between the mobile terminal of the user and said process control objects in a predetermined area around the mobile terminal; and
determine a primary process control object, which is the process control object that is closest to the mobile terminal in the predetermined area around the mobile terminal, and
the presentation control unit is configured to:
obtain process data of the primary process control object; and
automatically present representations of said process control objects on a display of the mobile terminal, and
wherein:
the presentation of the representation of the primary process control object is emphasized compared with the presentation of the other process control objects,
said process data is presented together with the corresponding representation at a center of the display of the mobile terminal and is highlighted, and includes extended detail information comprising at least one of a faceplate of the primary process control object or real time process data,
the amount of process data being presented increases with decreasing distance between the mobile terminal and the primary process control object, and
the data presentation control arrangement executed by a processor.

8. The data presentation control arrangement according to claim 7, wherein the presentation control unit is further configured to obtain and present process data of at least one other process control object in the predetermined area around the mobile terminal, where the amount of process data of the other process control object being presented together with the representation of this process control object is less than the amount of process data presented together with the representation of the primary process control object.

9. The data presentation control arrangement according to claim 7, wherein representations of the process control objects can be actuated for presenting further process data and the presentation control unit is further configured to present further process data related to a process control object based on a user actuation of the representation of the corresponding process control object.

10. The data presentation control arrangement according to claim 7, wherein the positioning unit is further configured to obtain position data of the mobile terminal, obtain position data about process control objects in the predetermined area around the mobile terminal and determine the distances based on said position data.

11. The data presentation control arrangement according to claim 7, wherein it is implemented in the mobile terminal of the user.

12. The data presentation control arrangement according to claim 7, wherein it is implemented in a data presentation control server in the process control system.

13. The data presentation control arrangement according to claim 7, wherein the process control objects are devices with interfaces via which measurements of the industrial process are being made and to which control commands are given.

14. A computer program product for enabling a user of a process control system to obtain details of a process control object, wherein the process control system is a computerized process control system of an industrial plant for controlling an industrial process and comprises a plurality of process control objects, said computer program product being provided on a non-transitory data carrier comprising computer program code configured to cause a data presentation control arrangement to, when said computer program code is loaded into at least one device providing the data presentation control arrangement:
guide the user carrying a mobile terminal to a predetermined area around a first process control object based on an indication of the first process control object needing inspection, and
when in the predetermined area around the first process control object further:
determine distances between a mobile terminal of the user and said process control objects in a predetermined area around the mobile terminal;
determine a primary process control object, which is the process control object that is closest to the mobile terminal in the predetermined area around the mobile terminal;
obtain process data of the primary process control object; and
automatically present representations of said process control objects on a display of the mobile terminal,
wherein:
the presentation of the representation of the primary process control object is emphasized compared with the presentation of the other process control objects in the predetermined area around the mobile terminal, and said process data is presented together with the corresponding representation at a center of the display of the mobile terminal and is highlighted, and includes extended detail information comprising
at least one of a faceplate of the primary process control object or real time process data, and the amount of process data being presented increases with decreasing distance between the mobile terminal and the primary process control object.

15. The computer program product according to claim 14, wherein the process control objects are devices with interfaces via which measurements of the industrial process are being made and to which control commands are given.

\* \* \* \* \*